US012561458B2

(12) United States Patent (10) Patent No.: US 12,561,458 B2
Song (45) Date of Patent: Feb. 24, 2026

(54) METHOD AND APPARATUS FOR HIDING DATA TRENDS IN MACHINE TO MACHINE SYSTEM

(71) Applicants:Hyundai Motor Company, Seoul (KR); Kia Corporation, Seoul (KR); Industry Academy Cooperation Foundation of Sejong University, Seoul (KR)

(72) Inventor: Jae Seung Song, Seoul (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 300 days.

(21) Appl. No.: 18/070,252

(22) Filed: Nov. 28, 2022

(65) Prior Publication Data

US 2023/0169194 A1 Jun. 1, 2023

Related U.S. Application Data

(60) Provisional application No. 63/283,728, filed on Nov. 29, 2021.

(51) Int. Cl.
*G06F 21/62* (2013.01)
*G16Y 20/40* (2020.01)
(52) U.S. Cl.
CPC .............. *G06F 21/62* (2013.01); *G16Y 20/40* (2020.01)

(58) Field of Classification Search
CPC ...................................................... G06F 21/62
See application file for complete search history.

(56) References Cited

U.S. PATENT DOCUMENTS

| | | | | |
|---|---|---|---|---|
| 8,281,392 | B2 * | 10/2012 | Sinha .................. | H04L 63/1441 |
| | | | | 713/153 |
| 8,800,008 | B2 * | 8/2014 | Sturtevant ............. | G06F 21/604 |
| | | | | 711/6 |
| 9,450,973 | B2 * | 9/2016 | Sheleheda ........... | H04W 12/122 |
| 9,680,817 | B2 * | 6/2017 | Hu ....................... | H04L 63/0861 |
| 9,948,682 | B2 * | 4/2018 | Anton .................... | H04L 63/10 |
| 10,673,880 | B1 * | 6/2020 | Pratt .................... | H04L 63/1425 |
| 10,805,325 | B2 * | 10/2020 | Shulman ............. | H04L 63/1425 |
| 11,075,926 | B2 * | 7/2021 | Mady .................. | H04L 63/1441 |
| 11,075,931 | B1 * | 7/2021 | Warren ............... | H04L 63/1416 |
| 11,356,450 | B2 * | 6/2022 | Ferguson ............. | H04L 9/0637 |
| 11,533,622 | B2 * | 12/2022 | Pampati ............. | H04L 12/4633 |
| 11,568,750 | B2 * | 1/2023 | Averbuch ............ | G08G 1/0129 |

(Continued)

OTHER PUBLICATIONS

OneM2M Technical Specification; Document Number; TS-0001-V4.8.; Document Name; Functional Architecture; Nov. 16, 2020.

(Continued)

*Primary Examiner* — Viral S Lakhia
(74) *Attorney, Agent, or Firm* — Fox Rothschild LLP

(57) ABSTRACT

The present disclosure relates to hiding data trends in a machine-to-machine (M2M) system. A method for operating a first device in a machine-to-machine (M2M) system may include: performing a registration procedure for a second device; receiving real data generated by the second device; obtaining fake data of an identical type as the real data; and storing the real data and the fake data in a same resource.

18 Claims, 10 Drawing Sheets

(56) References Cited

U.S. PATENT DOCUMENTS

| | | | | |
|---|---|---|---|---|
| 11,948,377 | B2 * | 4/2024 | Ross | H04L 63/0861 |
| 12,088,600 | B1 * | 9/2024 | Beauchesne | G06N 5/01 |
| 2018/0041546 | A1 * | 2/2018 | Gomez | H04L 63/205 |
| 2020/0336913 | A1 * | 10/2020 | Pampati | H04L 12/4641 |
| 2020/0382526 | A1 * | 12/2020 | Norton | G06F 21/6254 |
| 2021/0089657 | A1 * | 3/2021 | Dunjic | G06F 21/52 |
| 2021/0089658 | A1 * | 3/2021 | Dunjic | G06F 11/3688 |
| 2022/0417267 | A1 * | 12/2022 | Szigeti | H04L 63/1425 |
| 2023/0186098 | A1 * | 6/2023 | Chang | G06N 3/045 |
| | | | | 706/25 |

OTHER PUBLICATIONS

OneM2M Technical Specification; Document Number; TS-0001-V3.15.1; Document Name; Functional Architecture; May 7, 2019.

* cited by examiner

METHOD AND APPARATUS FOR HIDING DATA TRENDS IN MACHINE TO MACHINE SYSTEM

CROSS REFERENCE TO RELATED APPLICATION

The present application claims priority to a U.S. provisional application 63/283,728, filed Nov. 29, 2021, the entire contents of which is incorporated herein for all purposes by this reference.

BACKGROUND OF THE DISCLOSURE

Field of the Disclosure

The present disclosure relates to a machine-to-machine (M2M) system and, more particularly, to a method and apparatus for hiding a data trend in an M2M system.

Description of the Related Art

Recently, introduction of Machine-to-Machine (M2M) system has become active. An M2M communication may refer to a communication performed between machines without human intervention. M2M may refer to Machine Type Communication (MTC), Internet of Things (IoT) or Device-to-Device (D2D). In the following description, the term "M2M" may be uniformly used for convenience of explanation, but the present disclosure may not be limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present disclosure provides a method and apparatus for preventing misuse of data in a machine-to-machine (M2M) system.

The present disclosure provides a method and apparatus for protecting personal information in an M2M system.

The present disclosure provides a method and apparatus for protecting data from a hacker in an M2M system.

The present disclosure provides a method and apparatus for preventing a user's behaviors from being detected from data in an M2M system.

According to an embodiment of the present disclosure, a method for operating a first device in a machine-to-machine (M2M) system may include: performing a registration procedure for a second device; receiving real data generated by the second device; obtaining fake data of an identical type as the real data; and storing the real data and the fake data in a same resource.

According to an embodiment of the present disclosure, a first device in a machine-to-machine (M2M) system may include a transceiver and a processor coupled with the transceiver, and the processor may be configured to perform a registration procedure for a second device, to receive real data generated by the second device, to obtain fake data of an identical type as the real data, and to store the real data and the fake data in a same resource.

According to the present disclosure, data may be effectively protected in a machine-to-machine (M2M) system.

Effects obtained in the present disclosure may not be limited to the above-mentioned effects, and other effects not mentioned above may be clearly understood by those skilled in the art from the following description.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Figure 1:
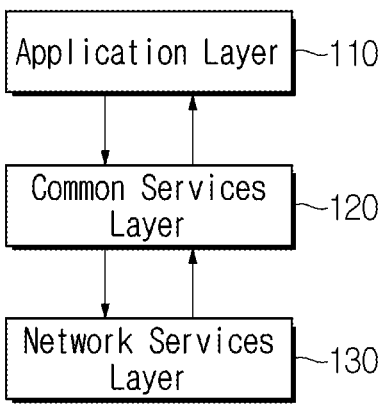
FIG. 1 illustrates a layered structure of a machine-to-machine (M2M) system according to the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In the present disclosure, the terms first, second, etc. may be used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component. In addition, as understood by a person of skill in the art reading the present disclosure, the components may not be separated, but merely indicate different functions for a single component structure. For example, a first memory for storing data A and a second memory for storing data B may include either separate memory for storing the separate data or could, in fact, be implemented in a single memory unit that stores both data A and data B.

In the present disclosure, when a component may be referred to as being "linked", "coupled", or "connected" to another component, it may be understood that not only a direct connection relationship but also an indirect connection relationship through an intermediate component may also be included. Also, when a component may be referred to as "comprising" or "having" another component, it may mean further inclusion of another component not the exclusion thereof, unless explicitly described to the contrary.

In the present disclosure, components that may be distinguished from each other may be intended to clearly illustrate each feature. However, it does not necessarily mean that the components may be separate. In other words, a plurality of components may be integrated into one hardware or software unit, or a single component may be distributed into a plurality of hardware or software units. Thus, unless otherwise noted, such integrated or distributed embodiments may be also included within the scope of the present disclosure.

In the present disclosure, components described in the various embodiments may not be necessarily essential components, and some may be optional components. Accordingly, embodiments consisting of a subset of the components described in one embodiment may be also included within the scope of the present disclosure. Also, exemplary embodiments that include other components in addition to the components described in the various exemplary embodiments may also be included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings may be omitted, and like parts may be denoted by similar reference numerals.

Although an exemplary embodiment may be described as using a plurality of units to perform the exemplary process, it may be understood that the exemplary processes may also be performed by one or plurality of modules. Additionally, it may be understood that the term controller/control unit refers to a hardware device that includes a memory and a processor and may be specifically programmed to execute the processes described herein. The memory may be configured to store the modules and the processor may be specifically configured to execute said modules to perform one or more processes which may be described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but may not be limited thereto. An M2M terminal may operate based on another wireless communication network and may not be limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and may not be limited to the embodiment described above.

In addition, for example, the present disclosure mainly describes an M2M system but may not be solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and may not be limited to the embodiment described above.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The present disclosure relates to a method and device for protecting data in an machine-to-machine (M2M) system. Particularly, the present disclosure describes a technology of hiding a trend of data by using fake data in an M2M system.

oneM2M may be a de facto standards organization that was founded to develop a communal IoT service platform sharing and integrating application service infrastructure (platform) environments beyond fragmented service platform development structures limited to separate industries like energy, transportation, national defense and public service. oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers may be implemented in a common services layer between M2M applications and communication Hardware/Software (HW/SW) rendering data transmission. For example, a common services layer may be a part of a layered structure illustrated in FIG. 1. The oneM2M standards are referred to herein and incorporated in their entirety into this application. Specifically, the technical specification of the oneM2M Functional Architecture is referred to herein and incorporated herein in its entirety. See Document No. TS-0001-V4.8.0, Functional Architecture and Document No. TS-0001-V3.15.1, Functional Architecture.

FIG. 1 illustrates a layered structure of an Machine-to-Machine (M2M) system according to the present disclosure. Referring to FIG. 1, a layered structure of an M2M system may include an application layer 110, a common services layer 120 and a network services layer 130. Herein, the application layer 110 may be configured as a layer operating based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be configured as a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may be configured to provide a set of services that may be grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may be configured to provide the common services layer 120 with services such as device management, location service and device triggering. Herein, an entity operating based on the network layer 120 may be a network service entity (NSE).

Figure 2:
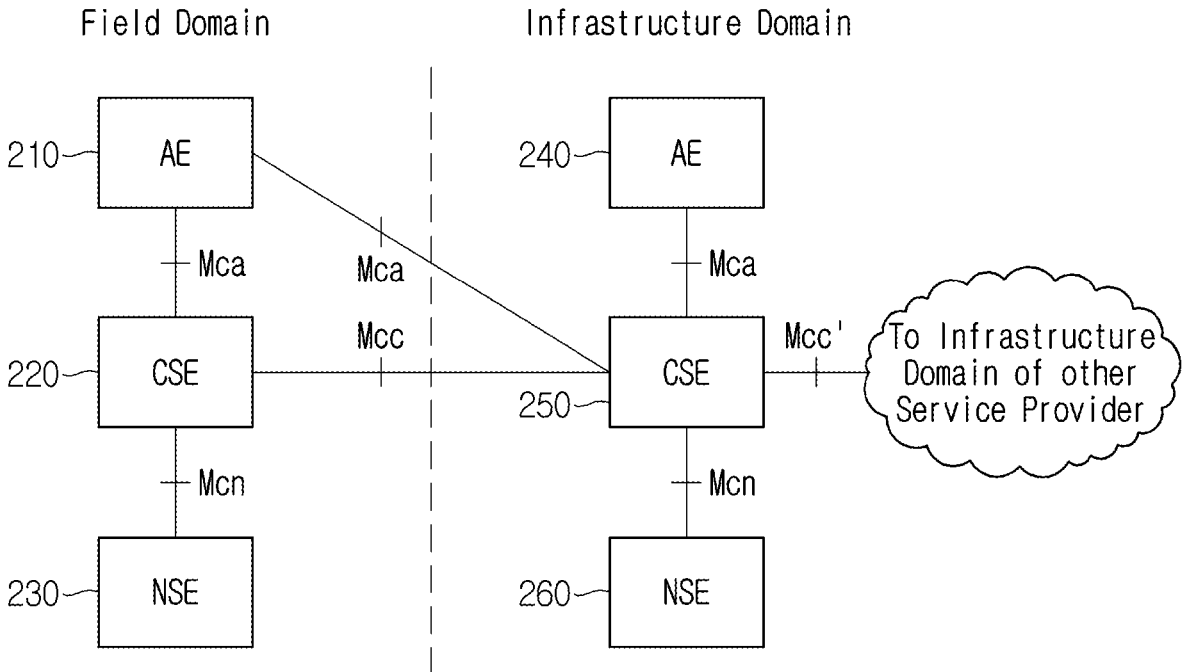
FIG. 2 illustrates a reference point in an M2M system according to the present disclosure.

FIG. 2 illustrates reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
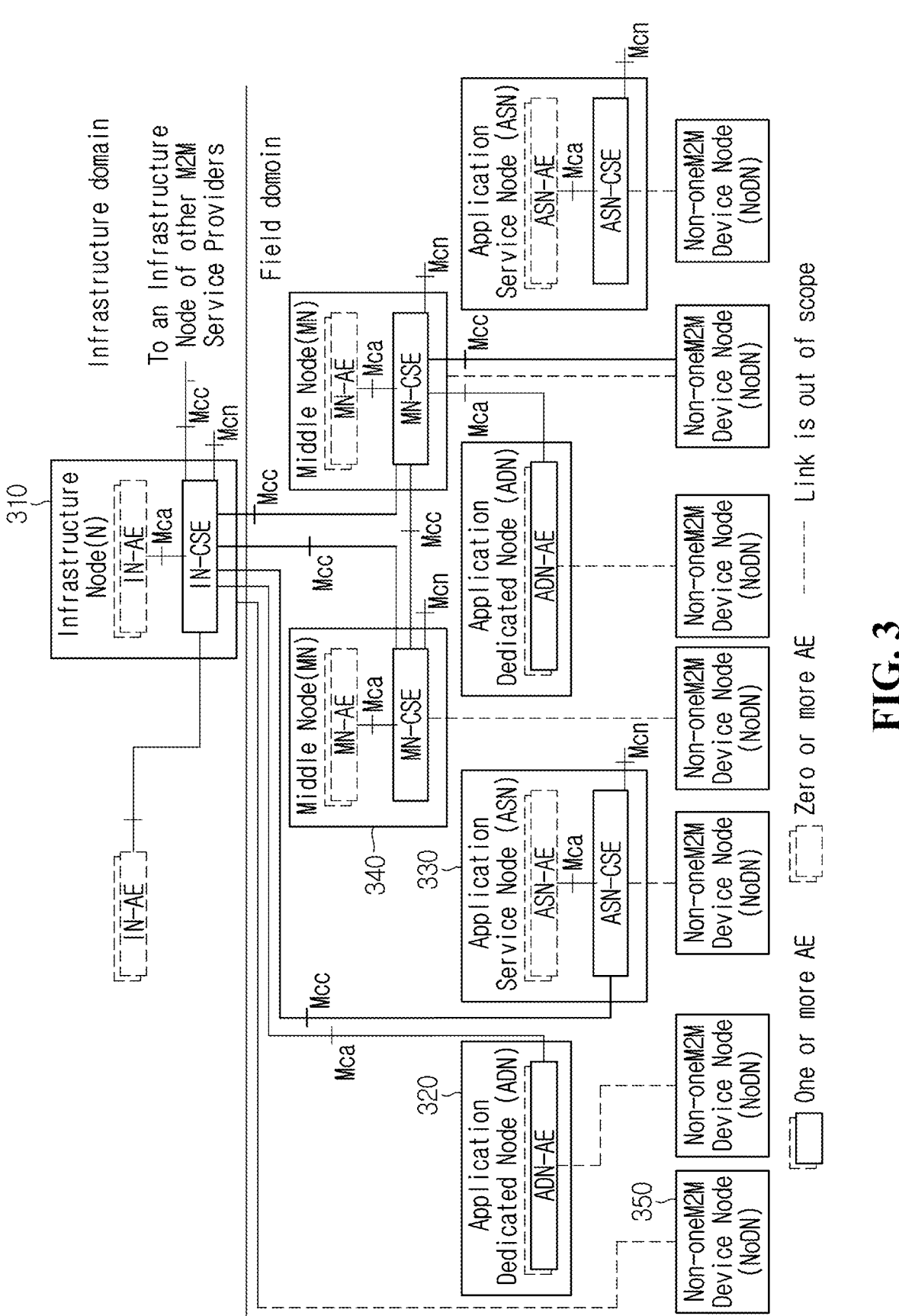
FIG. 3 illustrates each node in an M2M system according to the present disclosure.

FIG. 3 illustrates each node in an M2M system according to the present disclosure. Referring to FIG. 3, an infrastructure domain of a specific M2M service provider may be configured to provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be configured as a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that may be set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that may be set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) may be a node that does not include M2M entities. It may be a node that performs management or collaboration together with an M2M system.

Figure 4:
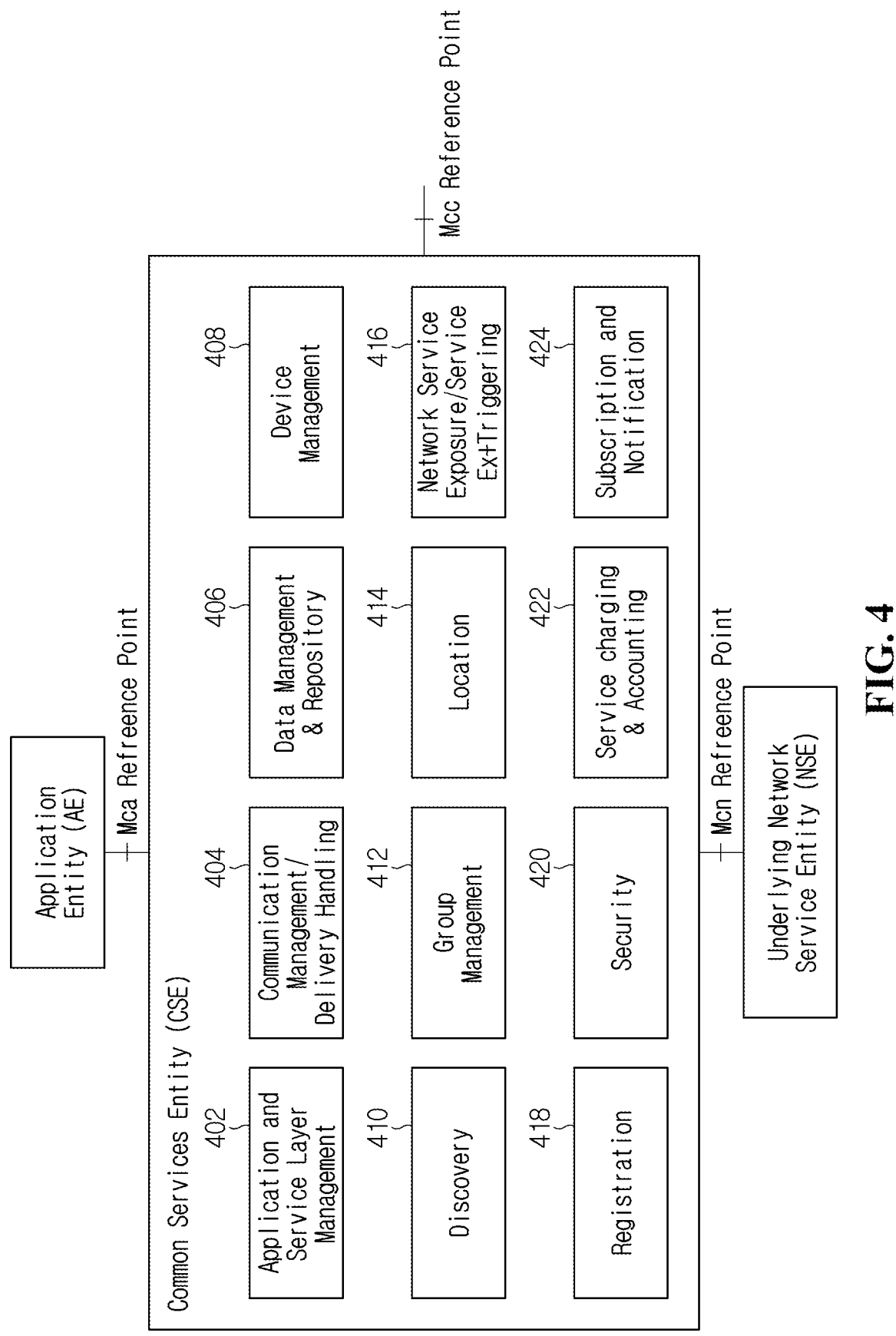
FIG. 4 illustrates a common service function in an M2M system according to the present disclosure.

FIG. 4 illustrates a common service function in an M2M system according to the present disclosure. Referring to FIG. 4, common service functions may be provided. For example, a common service entity may be configured to provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and may not be limited to the above-described exemplary embodiment.

The application and service layer management 402 CSF may be configured to provide management of AEs and CSEs. The application and service layer management 402 CSF may be configured to include not only the configuring, problem solving and upgrading of CSE functions but also the capability of upgrading AEs. The communication management and delivery handling 404 CSF may be configured to provide communications with other CSEs, AEs and NSEs. The communication management and delivery handling 404 CSF may be configured to determine at what time and through what connection communications may be delivered, and also determine to buffer communication requests to deliver the communications later, if necessary and permitted.

The data management and repository 406 CSF may be configured to provide data storage and transmission functions (for example, data collection for aggregation, data reformatting, and data storage for analysis and sematic processing). The device management 408 CSF may be configured to provide the management of device capabilities in M2M gateways and M2M devices.

The discovery 410 CSF may be configured to provide an information retrieval function for applications and services based on filter criteria. The group management 412 CSF may be configured to provide processing of group-related requests. The group management 412 CSF may be configured to enable an M2M system to support bulk operations for many devices and applications. The location 414 CSF may be configured to enable AEs to obtain geographical location information.

The network service exposure/service execution and triggering 416 CSF may be configured to manage communications with base networks for access to network service functions. The registration 418 CSF may be configured to provide AEs (or other remote CSEs) to a CSE. The registration 418 CSF may be configured to allow AEs (or remote CSE) to use services of CSE. The security 420 CSF may be configured to provide a service layer with security functions like access control including identification, authentication and permission. The service charging and accounting 422 CSF may be configured to provide charging functions for a service layer. The subscription/notification 424 CSF may be configured to allow subscription to an event and notifying the occurrence of the event.

Figure 5:
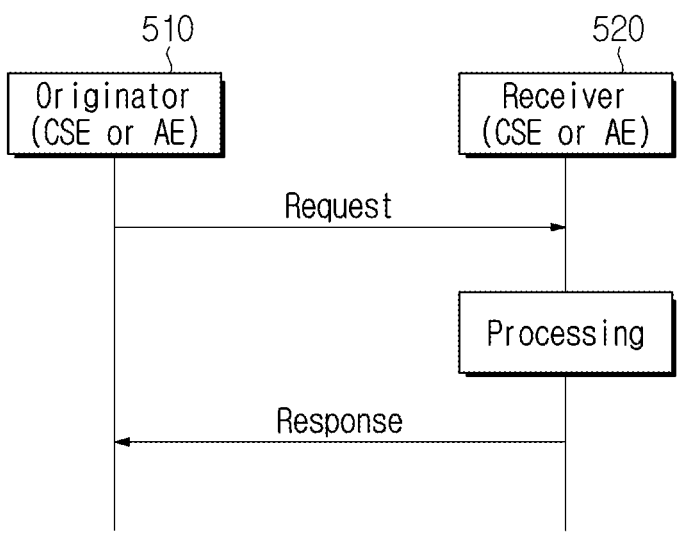
FIG. 5 illustrates a method in which an originator and a receiver exchange a message in an M2M system according to the present disclosure.

FIG. 5 illustrates an exchange of a message between an originator and a receiver in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 may not be limited to M2M terminals but may be other terminals. They may not be limited to the above-described exemplary embodiment. In addition, for example, the originator 510 and the receiver 520 may be nodes, entities, servers or gateways, which may be described above. In other words, the originator 510 and the receiver 520 may be hardware or software configurations and may not be limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete or Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter may be valid and authorized. In particular, in response to determining that a parameter may be valid and authorized, the receiver 520 may be configured to check whether there may be a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
|---|
| Response Status Code - successful, unsuccessful, ack |
| Request Identifier - uniquely identifies a Request message |
| Content - to be transferred |
| To - the identifier of the Originator or the Transit CSE that sent the corresponding non-blocking request |
| From - the identifier of the Receiver |

TABLE 1-continued

| Response message parameter/success or not |
|---|
| Originating Timestamp - when the message was built |
| Result Expiration Timestamp - when the message expires |
| Event Category - what event category shall be used for the response message |
| Content Status |
| Content Offset |
| Token Request Information |
| Assigned Token Identifiers |
| Authorization Signature Request Information |
| Release Version Indicator - the oneM2M release version that this response message conforms to |

A filter criteria condition, which may be used in a request message or a response message, may be defined as in Table 2 and Table 3 below.

TABLE 2

| Condition tag | Multiplicity | Description Matching Conditions |
|---|---|---|
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. |
| childLabels | 0 . . . 1 | A child of the matched resource has labels attributes matching the specified value. The evaluation is the same as for the labels attribute above. |
| parentLabels | 0 . . . 1 | The parent of the matched resource has labels attributes matching the specified value. The evaluation is the same as for the labels attribute above. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentsize attribute of the <contentInstance> matched resource is equal to or greater than the specified value. |
| sizeBelow | 0 . . . 1 | The contentsize attribute of the <contentInstance> matched resource is smaller than the specified value. |
| contentType | 0 . . . n | The contentinfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |

TABLE 2-continued

| Condition tag | Multiplicity | Description<br>Matching Conditions |
|---|---|---|
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description<br>Filter Handling Conditions |
|---|---|---|
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . . /tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either manda- tory or optional according to a requested operation or a mandatory response code. For example, a request message may include at least one parameter among those listed in Table 4 below.

TABLE 4

| Request message parameter |
| --- |

| Mandatory | Operation - operation to be executed/CREAT, Retrieve, Update, Delete, Notify |
| --- | --- |
| | To - the address of the target resource on the target CSE |
| | From - the identifier of the message Originator |
| | Request Identifier - uniquely identifies a Request message |
| Operation | Content - to be transferred |
| dependent | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members-indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |
| | Local Token IDs - for use in dynamic authorization |
| | Authorization Signature Indicator - for use in Authorization Relationship Mapping |
| | Authorization Signature - for use in Authorization Relationship Mapping |
| | Authorization Relationship Indicator - for use in Authorization Relationship Mapping |
| | Semantic Query Indicator - for use in semantic queries |
| | Release Version Indicator - the oneM2M release version that this request message conforms to. |
| | Vendor Information |

A normal resource includes a complete set of representations of data constituting the base of information to be managed. Unless qualified as either "virtual" or "announced", the resource types in the present document may be normal resources. A virtual resource may be used to trigger processing and/or a retrieve result. However, a virtual resource may not have a permanent representation in a CSE. An announced resource may contain a set of attributes of an original resource. When an original resource changes, an announced resource may be automatically updated by the hosting CSE of the original resource. The announced resource contains a link to the original resource. Resource announcement enables resource discovery. An announced resource at a remote CSE may be used to create a child resource at a remote CSE, which may not be present as a child of an original resource or may not be an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Data may reveal a lot of useful information. For example, personal information may be retrieved from a set of data. Alternatively, a personal behavior may be detected from a trend of data. In addition, a hacker may recognize when a trend of energy usage may not be used and when a victim stays at home. Accordingly, the present disclosure proposes various embodiments of protecting real data by adding fake data to an existing dataset.

Figure 6:
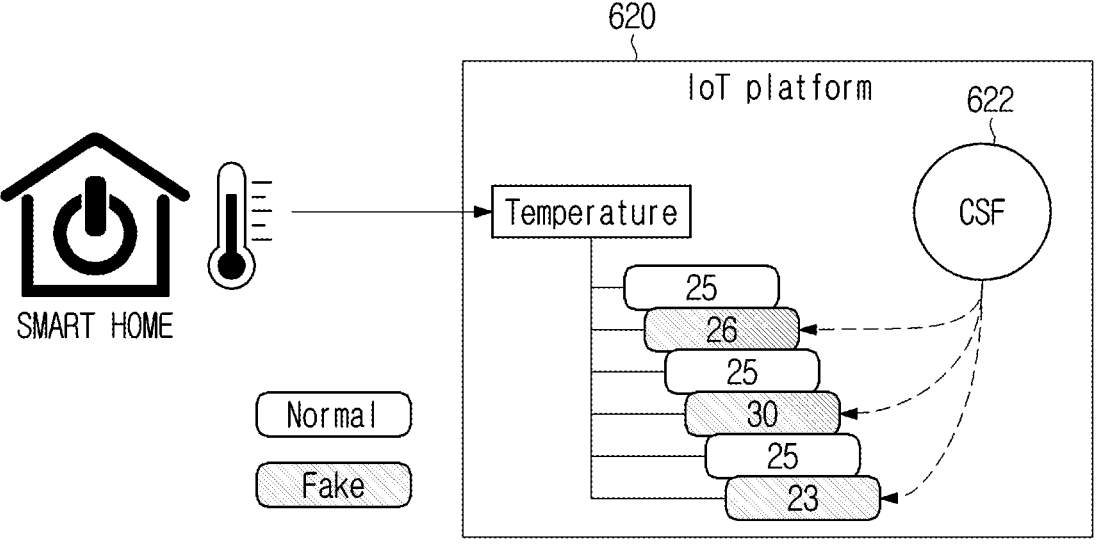
FIG. 6 illustrates a concept of data trend hiding in an M2M system according to the present disclosure.

FIG. 6 illustrates a concept of data trend hiding in an M2M system according to the present disclosure. FIG. 6 exemplifies an interaction between a smart home 610 and an IoT platform 620. Referring to FIG. 6, a set of data may be generated by IoT devices in the smart home 610. For example, data indicating temperatures may be generated by IoT devices in the smart home 610. Herein, according to an embodiment, a CSF 622 in the IoT platform 620 may be configured to generate fake data and insert the fake data to a proper place. Herein, the fake data means data that conforms to a same form as real data (e.g., temperature data generated by the measurement of an IoT device) and includes an identical type of information but has a value determined by a calculation or operation different from the real data.

As an opposite concept to fake data, data generated by IoT device in the smart home 610 may be referred to as normal data or real data. Depending on the access control or ownership of the device or home, a proper user may see normal data, while hackers or others may see fake data alone or normal data with fake data. In the description below, normal data may be referred to by 'real data,' 'original data' or any other terms with an equivalent technical meaning.

According to various embodiments, a resource to be protected may be identified. In addition, a resource including fake data may be marked. In addition, an access-controlled or allowed user may see original data without fake data.

According to various embodiments, a CSF may be configured to perform the following operations: the CSF generates fake data; the CSF generates a new resource including the generated fake data. When there may be a request for discovery or retrieval, the IoT platform may perform the following operations: the IoT platform checks access-controlled or allowed user information from a resource; when the request may be received from an owner or proper access control, the IoT platform returns a normal value; when the request may be received from others, the IoT platform returns data with fake data.

Figure 7A:
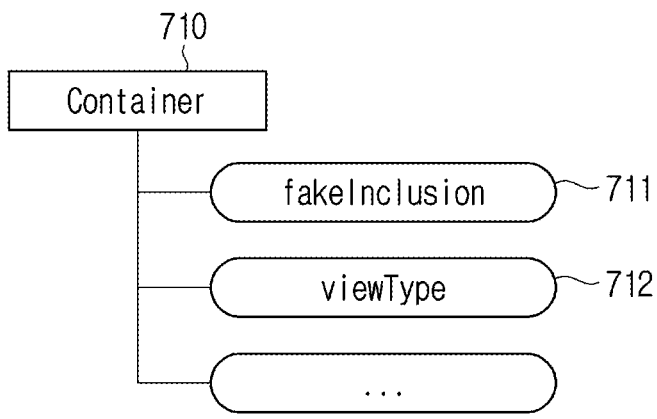
FIG. 7A and FIG. 7B illustrate examples of resources related to fake data in an M2M system according to the present disclosure.
Figure 7B:
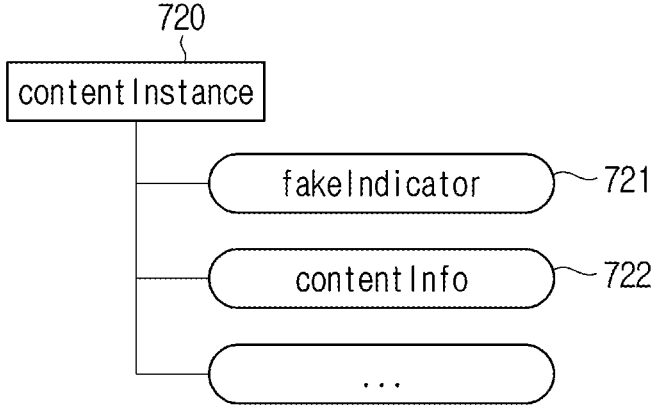

FIG. 7A and FIG. 7B illustrate examples of resources related to fake data in an M2M system according to the present disclosure. FIG. 7A exemplifies information required in a resource (e.g., <container>) for using fake data, and FIG. 7B exemplifies information required in a resource (e.g., <contentInstance>) for using fake data.

Referring to FIG. 7A, information required in a resource 710 (e.g., <container>) for using fake data may include a fake inclusion indicator 711 (e.g., fakeInclusion) and a view type 712 (e.g., viewType). The fake inclusion indicator 711 may be configured to indicate that the container resource contains fake data. The view type 712 contains information regarding who may see an original value and who will see a set of data including fake data. That is, the view type 712 contains information for identifying a device that may be allowed to retrieve data in the resource 710 with exclusion of fake data. In addition, although not illustrated in FIG. 7, the resource 710 may further contain information specifying a rule for generating fake data. For example, a rule for generating fake data may include a ratio between real data and fake data, information on an algorithm of generating fake data, and the like.

Referring to FIG. 7B, information required in a resource 720 (e.g., <contentInstance>) for using fake data may include a fake indicator 712 (e.g., fakeIndicator) and content information 722 (e.g., contentInfo). The fake indicator 721 may be configured to indicate that information included in the resource is not normal information. The content information 722 may be used to include fake information.

Fake-related information may be accessed by users. That is, users cannot access information associated with fake data (e.g., fakeIndicator, fakeInclusion, viewType, accessType-Fake). Only the IoT platform may access information associated with fake data. In other words, information regarding generation of fake data and information regarding identification of fake data may be accessible only to the IoT platform (e.g., CSE), and access by a device (e.g., AE) using data may be prohibited.

Figure 8:
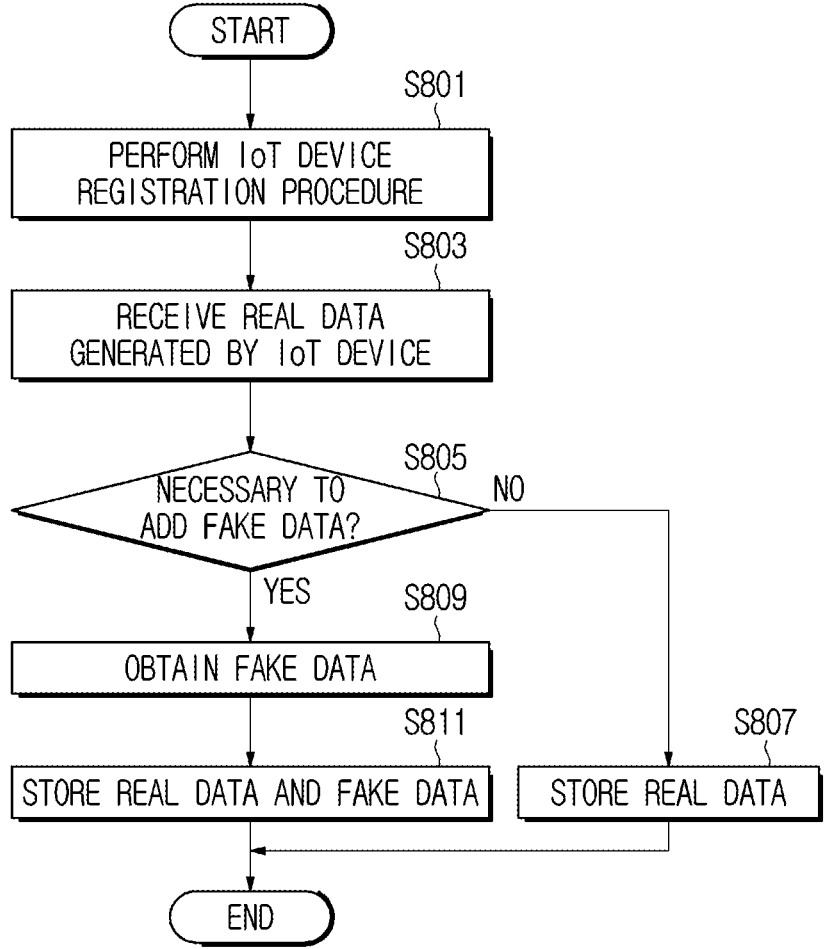
FIG. 8 illustrates an example of a procedure of including fake data in a resource in an M2M system according to the present disclosure.

FIG. 8 illustrates an example of a procedure of including fake data in a resource in an M2M system according to the present disclosure. An operation subject of FIG. 8 may be a device (e.g., CSE) that manages a resource. In the description below, the operation subject of FIG. 8 may be referred to as 'device'.

Referring to FIG. 8, at step S801, the device performs a registration procedure for an IoT device. To this end, the device may perform signaling for registration with the IoT device. Through the signaling, the device may determine to store fake data together, when storing data received from the IoT device, and generate information indicating inclusion of the fake data.

At step S803, the device receives real data generated by the IoT device. For example, the IoT device may be a sensor, and the received data may include a measurement value that may be obtained through sensing. That is, the real data includes a measurement value that may be sensed during an operation process of the IoT device.

At step S805, the device determines whether or not it is necessary to add fake data. That is, the device determines whether or not the registration procedure of the IoT device is configured to store fake data together. For example, by using information on the IoT device, which is generated during the registration procedure of the IoT device, the device checks whether or not it is specified to store fake data together.

If no fake data needs to be added, at step S807, the device stores real data. In other words, storing fake data together is not set, the device stores only real data without fake data. For example, the device may store real data in a resource that is generated for the IoT device.

If fake data needs to be added, at step S809, the device obtains fake data. According to an embodiment, the device may request fake data to another entity (e.g., CSF), which generates fake data, and receive fake data. Herein, the device may provide information for generating fake data. For example, the information for generating fake data may include at least one of information indicating a type of data and information indicating a statistical property of real data.

At step S811, the device stores real data and fake data. That is, the device stores the real data received at step S803 and the fake data generated at step S809 in a same resource together. For example, the device may store the real data and the fake data in a resource that is generated for the IoT device. Herein, each of the real data and the fake data is stored in sub-resources, and a sub-resource containing the fake data may include an indicator showing the fake data.

Figure 9:
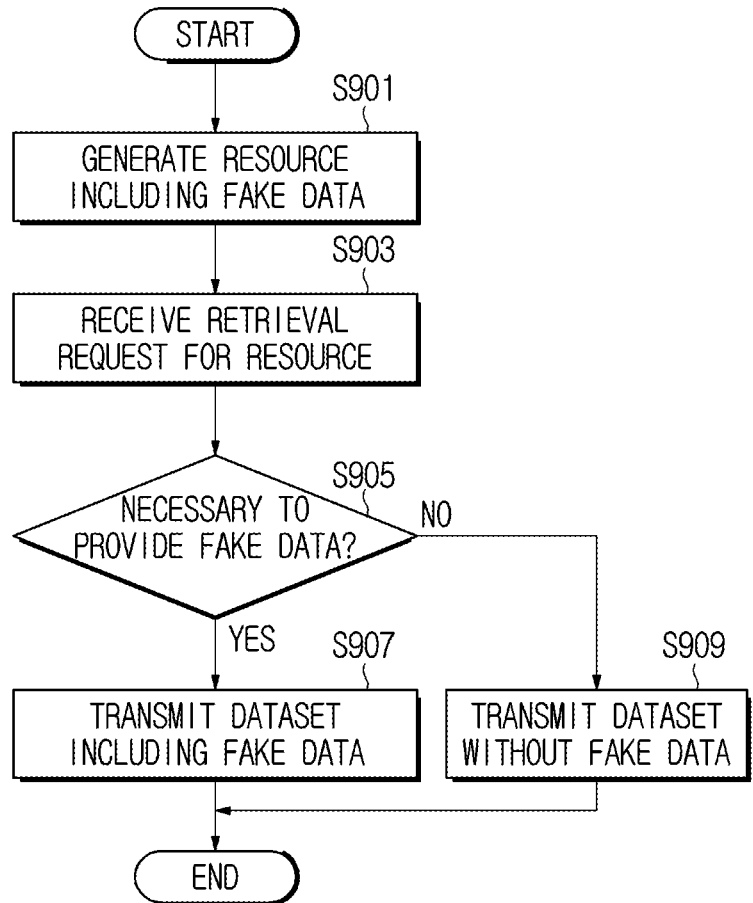
FIG. 9 illustrates an example of a procedure of including data generated by a sensor and fake data in a resource in an M2M system according to the present disclosure.

FIG. 9 illustrates an example of a procedure of including data generated by a sensor and fake data in a resource in an M2M system according to the present disclosure. An operation subject of FIG. 9 may be a device (e.g., CSE) that manages a resource. In the description below, the operation subject of FIG. 9 is referred to as 'device'.

Referring to FIG. 9, at step S901, the device generates a resource including fake data. For example, the device may generate the resource, generate, or obtain fake data when real data associated with the resource occurs, and store the real data and the fake data in the resource. Herein, the resource may include at least one of information indicating a setting about inclusion of fake data and information for identifying a device that is allowed to exclude fake data.

At step S903, the device receives a retrieval request for a resource. The retrieval request for a resource may include information indicating the resource generated at step S901 or information for identifying the resource generated at step S901.

At step S905, the device determines whether or not it is necessary to provide fake data. In other words, the device provides real data included in the resource in response to the retrieval request and also determines whether or not to provide fake data included in the resource together. Whether or not it is necessary to provide fake data may be determined according to a device that transmits the retrieval request. For example, based on the information for identifying a device that is allowed to exclude fake data, the device may determine whether or not exclusion of fake data is allowed for the device transmitting the retrieval request.

In case fake data needs to be provided, at step S907, the device transmits a dataset including fake data. That is, the device transmits a dataset that includes fake data and real data.

In case no fake data needs to be provided, at step S909, the device transmits a dataset excluding fake data. That is, the device transmits a dataset that includes only real data without fake data.

Figure 10:
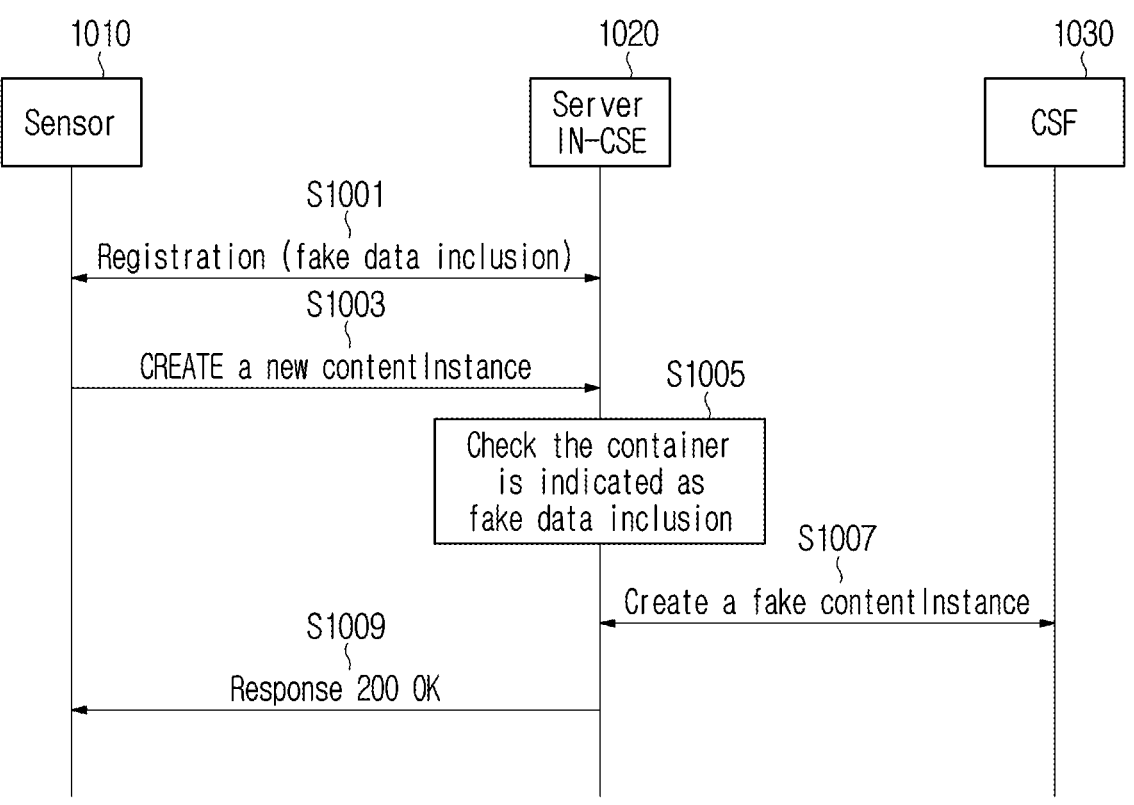
FIG. 10 illustrates an example of a procedure of processing a hacker's data request and an owner's data request in an M2M system according to the present disclosure.

FIG. 10 illustrates an example of a procedure of processing a hacker's data request and an owner's data request in an M2M system according to the present disclosure. FIG. 10 exemplifies a signal exchange among a sensor 1010, which is an IoT device, a server IN-CSE 1020 for managing a resource, and a CSF 1030 for generating fake data.

Referring to FIG. 10, at step S1001, the sensor 1010 and the server IN-CSE 1020 perform a registration procedure. To this end, the sensor 1010 may transmit at least one message about registration to the server IN-CSE 1020 and receive at least one message about registration from the server IN-CSE 1020. Herein, a setting about inclusion of fake data is added between the sensor 1010 and the server IN-CSE 1020. That is, the server IN-CSE 1020 sets fake data to be stored together when storing data generated by the sensor 1010. According to an embodiment, the server IN-CSE 1020 may add a setting about inclusion of fake data based on a device type of the sensor 1010. In this case, the server IN-CSE 1020 may transmit information notifying the setting about inclusion of fake data to the sensor 1010. Herein, the setting may be understood as being added to the resource <container>. In this case, the resource <container> may include an indicator indicating a setting about inclusion of fake data and information for distinguishing AEs, which will provide only real data, and AEs that will provide fake data together.

At step S1003, the sensor 1010 transmits a request for generation of a new resource <contentInstance> to the server IN-CSE 1020. That is, the sensor 1010 transmits a message for requesting generation of the resource <contentInstance> to the server IN-CSE 1020. Herein, the message may further include data to be stored in the resource <contentInstance>. Herein, the data included in the message is real data which is generated by the sensor 1010.

At step S1005, the server IN-CSE 1020 checks whether or not the resource <container> is indicated by fake data inclusion. In other words, the server IN-CSE 1020 checks whether or not a setting about inclusion of fake data is added to the resource <container> for storing data generated by the sensor 1010. For example, the server IN-CSE 1020 checks whether or not the resource <container> includes an indicator indicating that fake data is included. In this embodiment, a setting about inclusion of fake data is added to the resource <container>.

At step S1007, the server IN-CSE 1020 and the CSF 1030 perform operations for generating the resource <contentInstance> that includes fake data. According to an embodiment, the server IN-CSE 1020 may request the CSF 1030 to generate fake data, and the CSF 1030 may generate and transmit fake data to the server IN-CSE 1020. In addition, the server IN-CSE 1020 may generate the resource <contentInstance>, store an indicator indicating fake data and fake data generated by the CSF 1030 in the resource <contentInstance>, and then include the resource <contentInstance> containing the fake data in the resource <container> of the sensor 1010.

At step S1009, the server IN-CSE 1020 transmits a response message (e.g., 200 OK) to the sensor 1010. That is, the server IN-CSE 1020 notifies that the resource requested at step S1003 is completed generated. Herein, according to an embodiment, the response message may further include information that fake data is added.

Figure 11:
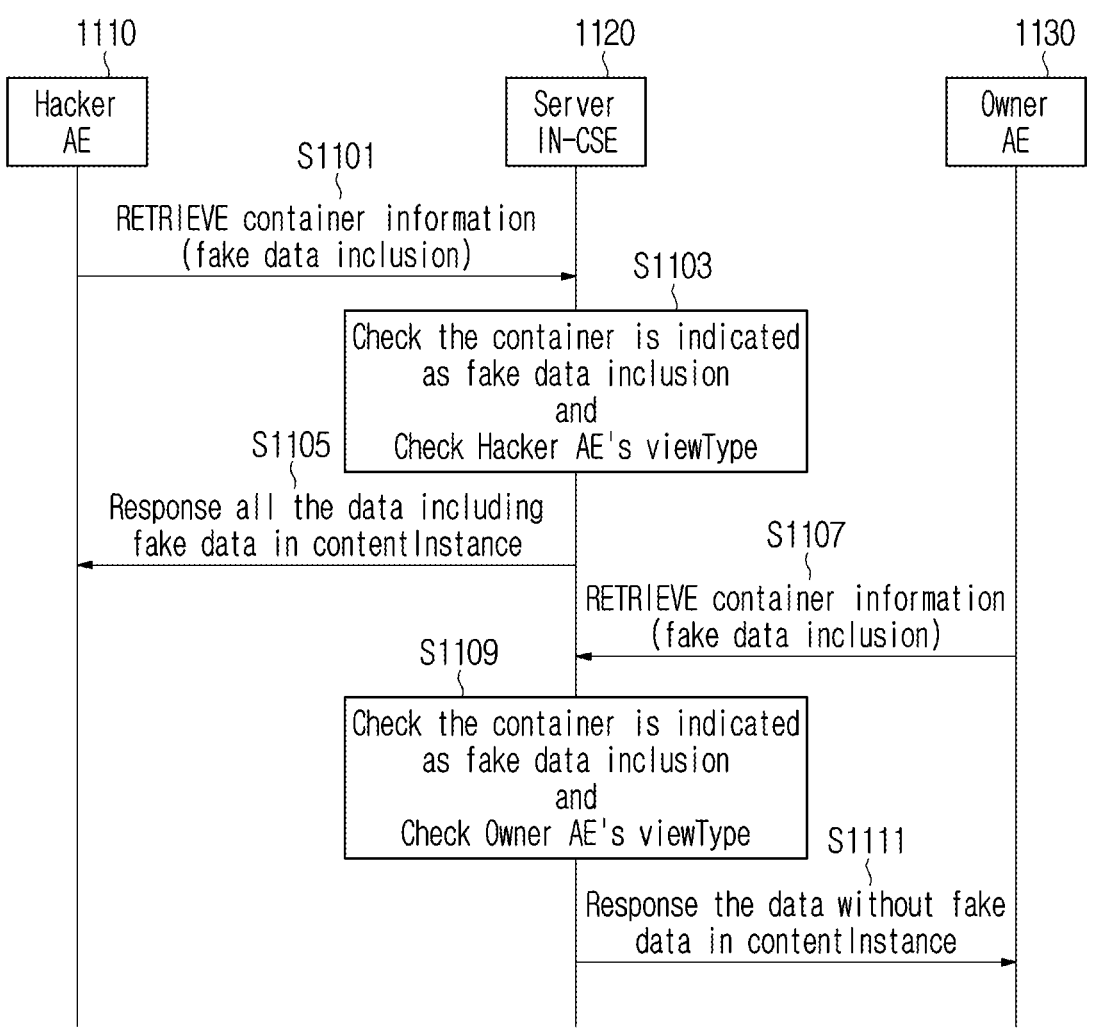
FIG. 11 illustrates an example of a procedure of providing fake data and real data in an M2M system according to the present disclosure.

FIG. 11 illustrates an example of a procedure of providing fake data and real data in an M2M system according to the present disclosure. FIG. 11 exemplifies the exchange of signals among a hacker AE 1110, a server IN-CSE 1120 for managing a resource, and an owner AE 1130.

Referring to FIG. 11, at step S1101, the hacker AE 1110 requests the server IN-CSE 1120 to retrieve information in a resource <container>. That is, the hacker AE 1110 transmits a message for requesting the server IN-CSE 1120 to provide information in the resource <container>. Herein, the resource <container> is generated for the owner AE 1130, and a setting about inclusion of fake data is added to it.

At step S1103, the server IN-CSE 1120 checks whether or not the <container> is indicated as fake data inclusion, and also checks a view type of the hacker AE 1110. That is, the server IN-CSE 1020 checks whether or not a setting about fake data inclusion is added to the resource <container>. In addition, the server IN-CSE 1120 determines, based on the view type, whether or not the hacker AE 1110 is eligible to read only real data. For example, the server IN-CSE 1120 checks whether or not a view type allowed to exclude fake data in the resource <container> matches the view type of the hacker AE 1110. In this embodiment, the hacker AE 1110 does not have any view type for which fake data exclusion is allowed.

At step S1105, the server IN-CSE 1120 transmits a response including all the data including fake data in the resource <contentInstance> to the hacker AE 1110. Since the hacker AE 1110 does not belong to a view type for which fake data exclusion is allowed, the server IN-CSE 1120 transmits a dataset including real data and fake data to the hacker AE 1110.

At step S1107, the owner AE 1130 requests the server IN-CSE 1120 to retrieve information in the resource <container>. That is, the owner AE 1130 transmits a message for requesting the server IN-CSE 1120 to provide information in the resource <container>. Herein, the resource <container> is generated for the owner AE 1130, and a setting about inclusion of fake data is added to it.

At step S1109, the server IN-CSE 1120 checks whether or not the <container> is indicated as fake data inclusion, and also checks a view type of the owner AE 1130. That is, the server IN-CSE 1020 checks whether or not a setting about fake data inclusion is added to the resource <container>. In addition, the server IN-CSE 1120 determines, based on the view type, whether or not the owner AE 1130 is eligible to read only real data. For example, the server IN-CSE 1120 checks whether or not a view type allowed to exclude fake data in the resource <container> matches the view type of the owner AE 1130. In this embodiment, the owner AE 1130 has a view type for which fake data exclusion is allowed.

At step S1111, the server IN-CSE 1120 transmits a response including data excluding fake data in the <contentInstance> to the owner AE 1130. Since the the owner AE 1130 belongs to a view type for which fake data exclusion is allowed, the server IN-CSE 1120 transmits a dataset including only real data to the owner AE 1130.

Figure 12:
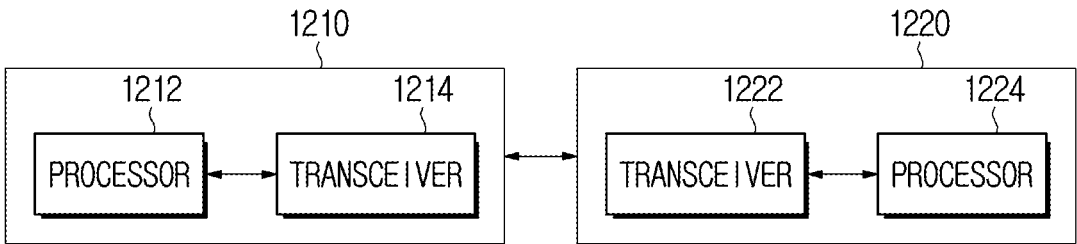
FIG. 12 illustrates a configuration of an M2M device in an M2M system according to the present disclosure.

FIG. 12 illustrates a configuration of an M2M device in an M2M system according to the present disclosure. An M2M device 1210 or an M2M device 1220 illustrated in FIG. 12 may be understood as hardware functioning as at least one among the above-described AE, CSE and NSE.

Referring to FIG. 12, the M2M device 1210 may include a processor 1212 controlling a device and a transceiver 1214 transmitting and receiving a signal. Herein, the processor 1212 may control the transceiver 1214. In addition, the M2M device 1210 may communicate with another M2M device 1220. The another M2M device 1220 may also include a processor 1222 and a transceiver 1224, and the processor 1222 and the transceiver 1224 may perform the same function as the processor 1212 and the transceiver 1214.

As an example, the originator, the receiver, AE and CSE, which may be described above, may be one of the M2M devices 1210 and 1220 of FIG. 12, respectively. In addition, the devices 1210 and 1220 of FIG. 12 may be other devices. As an example, the devices 1210 and 1220 of FIG. 12 may be communication devices, vehicles, or base stations. That is, the devices 1210 and 1220 of FIG. 12 refer to devices capable of performing communication and may not be limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations may be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both disclosures may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating a first device in a machine-to-machine (M2M) system, the method comprising:
  performing a registration procedure for a second device;
  receiving real data generated by the second device;
  obtaining fake data of an identical type of information as the real data but having a value determined by calculation or operation different from the real data;
  storing the real data and the fake data in a same resource; and
  transmitting, the real data with the fake data being excluded or the real data with the fake data, based on a result of whether a view type is matched or not;

wherein the view type identifies a device that is allowed to retrieve data in the resource with the fake data being excluded and wherein the view type is included in the resource;
  wherein the resource includes at least one of information on generation of the fake data and information on identification of the fake data, and
  wherein access by a device using data is prohibited for at least one of the information on generation of the fake data and the information on identification of the fake data.

2. The method of claim 1, wherein the fake data is stored in a sub-resource of the resource, and
  wherein the sub-resource includes an indicator indicating inclusion of the fake data.

3. The method of claim 1, wherein the resource includes an indicator indicating that the real data will be stored with the fake data.

4. The method of claim 1, wherein the resource includes information for identifying a device that is allowed to retrieve data in the resource with the fake data being excluded.

5. The method of claim 1, wherein the resource includes information on a rule for generating the fake data.

6. The method of claim 1, further comprising:
  transmitting a request to a third device to generate the fake data; and
  receiving the fake data from the third device.

7. The method of claim 6, further comprising transmitting, to the third device, at least one of information indicating a type of data and information indicating a statistical property of the real data.

8. The method of claim 1, further comprising:
  receiving, from the second device, a retrieval request for data in the resource; and
  transmitting, to the second device, the real data with the fake data being excluded.

9. The method of claim 1, further comprising:
  receiving, from a fourth device, a retrieval request for data in the resource; and
  transmitting, to the fourth device, the fake data and the real data.

10. A first device in a machine-to-machine (M2M) system, comprising:
  a transceiver; and
  a processor coupled with the transceiver,
  wherein the processor is configured to:
    perform a registration procedure for a second device,
    receive real data generated by the second device,
    obtain fake data of an identical type of information as the real data but having a value determined by calculation or operation different from the real data,
    store the real data and the fake data in a same resource; and
    transmit, the real data with the fake data being excluded or the real data with the fake data based on a result of whether a view type is matched or not;
    wherein the view type identifies a device that is allowed to retrieve data in the resource with the fake data being excluded and wherein the view type is included in the resource.

11. The first device of claim 10, wherein the same resource comprises a sub-resource, and
  wherein the processor is further configured to store the fake data in the sub-resource of the resource, and
  wherein the sub-resource includes an indicator configured to indicate inclusion of the fake data.

12. The first device of claim 10, wherein the resource includes an indicator configured to indicate that the real data is stored with the fake data.

13. The first device of claim 10, wherein the resource includes information for identifying a device that is allowed to retrieve data in the resource with the fake data being excluded.

14. The first device of claim 10, wherein the resource includes information on a rule for generating the fake data.

15. The first device of claim 10, wherein the processor is further configured to:

transmit a request to a third device to generate the fake data, and receive the fake data from the third device.

16. The first device of claim 15, wherein the processor is further configured to transmit, to the third device, at least one of information indicating a type of data and information indicating a statistical property of the real data.

17. The first device of claim 10, wherein the processor is further configured to:

receive, from the second device, a retrieval request for data in the resource; and transmit, to the second device, the real data with the fake data being excluded.

18. The first device of claim 10, wherein the processor is further configured to:

receive, from a fourth device, a retrieval request for data in the resource, and transmit, to the fourth device, the fake data and the real data.

\* \* \* \* \*